July 15, 1958 — A. J. KINDIG — 2,843,432
IDLER ROLL SHAFT SUPPORT AND INTERLOCK MEANS
Filed Aug. 26, 1954
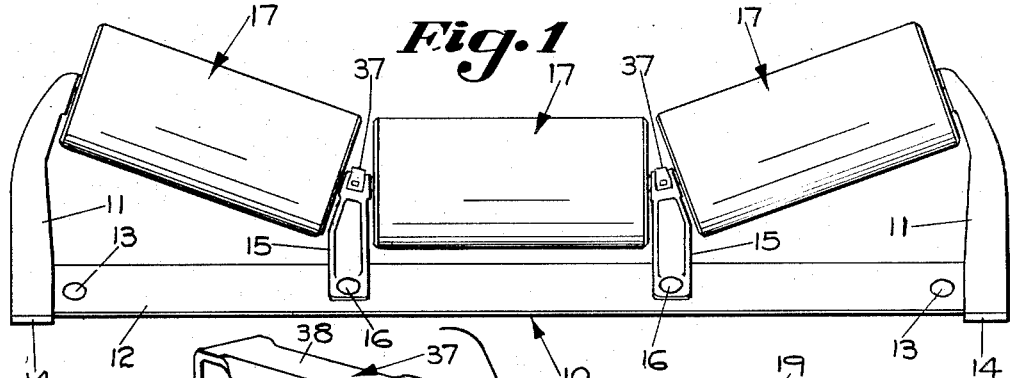
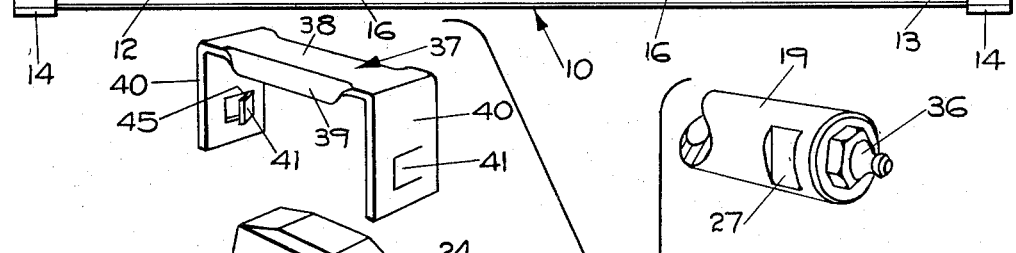
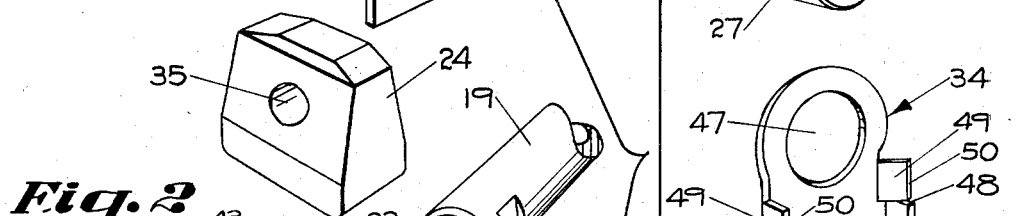
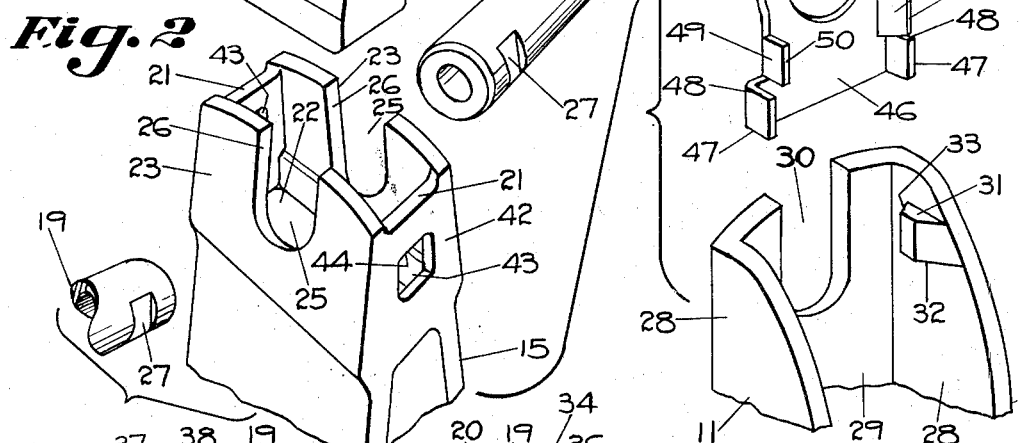
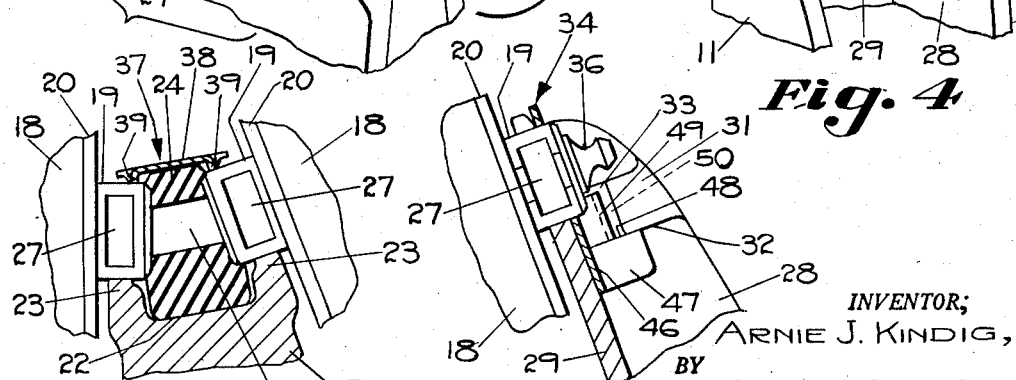
INVENTOR;
ARNIE J. KINDIG,
BY Donald J. Detrick,
AGENT.

2,843,432
Patented July 15, 1958

2,843,432

IDLER ROLL SHAFT SUPPORT AND INTERLOCK MEANS

Arnie J. Kindig, Columbus, Ohio, assignor to The Jeffrey Manufacturing Company, a corporation of Ohio Application August 26, 1954, Serial No. 452,378

5 Claims. (Cl. 308—20)

This invention relates to idler roll stands and, more specifically, to elements thereof that function to hold the shafts of the idler rolls.

One object of the invention is to provide an improved combination of elements in which there is an improved carrier for the shaft of a conveyor idler roll and improved clip means which cooperate with said carrier for preventing separation of said shaft from its carrier means.

Another object of the invention is to provide improved clips for preventing the separation of a conveyor idler roll shaft from its supporting carrier means.

Other objects of the invention will appear hereinafter, the novel features and combinations being set forth in the appended claims.

In the accompanying drawings:

Fig. 1 is a view in elevation of a conveyer idler roller assembly including the invention;

Fig. 2 is an exploded view in a larger scale showing elements of the assembly seen in Fig. 1 which cooperate to carry the ends of two adjacent shafts of the idler rolls of the assembly;

Fig. 3 is a view in section, the view being taken on a vertical plane bisecting the elements seen in Fig. 2, but showing said elements in assembled relation;

Fig. 4 is an exploded view on a larger scale, showing elements of the assembly seen in Fig. 1 which cooperate to carry the outermost end of one of the shafts of an end idler roll of the assembly; and Fig. 5 is a view in section, the section being taken on a vertical plane bisecting the elements seen in Fig. 4, but showing said elements in assembled relation.

The idler roller assembly employed to describe the invention includes a stand, chair or supporting main frame 10 having a pair of identical curved generally upright end legs or posts 11 interconnected by a structural beam 12 made of angle iron and secured at its ends by rivets 13 to brackets or lugs, not shown, which are integral parts of said legs 11. Legs or posts 11 each include a pair of feet 14 by which the stand 10 may be bolted to the main frame, for example, of a conveyer, not shown. Stand 10 also includes a pair of identical upright legs or posts 15 spaced between the end legs or posts 11 on the beam 12 and fastened thereto by rivets 16. Legs or posts 11 and 15 cooperate to carry or support three identical rolls 17 arranged to support and trough a run of an endless belt conveyer, not shown, as it travels thereover.

The idler rolls 17 are of a dead shaft type wherein the roll shells 18 are mounted for rotation through anti-friction bearings, not shown, upon a dead shaft 19 which extends axially through the shell 18 and protrudes at its ends beyond the end bells 20 of the roll shell in order that the opposite ends of the shaft 19 may be mounted in supports such as the legs or posts 11 and 15.

Referring now to Figs. 2 and 3 of the drawings wherein the upper or top portion of one of the legs or posts 15 and parts associated with it are shown, the leg or post is a casting the upper end of which includes an open topped box or pocket formed by a pair of identical oppositely spaced upright parallel walls 21, a bottom 22 and a pair of opposite identical generally upright walls 23. As indicated clearly in Figs. 1 and 3 of the drawings, one of the walls 23 lies in a vertical plane at right angles with respect to the axis of the shaft 19 of center roll 17 and the other wall 23 lies in an upright plane at right angles to the axis of the shaft 19 of an end roll 17. The result of this is, of course, that the box or pocket formed by the top of the post or leg 15 has two parallel side walls 21 and two downwardly sloping side walls 23 and a bottom 22 all of which are interconnected to form a box or pocket having a downwardly tapering interior shape adapted to receive and hold a tapered block 24 made of a resilient grease and oil resistant material such, for example, as neoprene. The function of block 24 is set forth hereinafter.

Each of the walls 23 forms an open topped yoke 25 in the leg 15 having parallel side walls 26 interconnected at their bottoms by a semicircular bottom wall. The yokes 25 of leg 15 each receive and support one end of each of the dead shafts 19 of adjacent rolls 17 and each of the dead shafts 19 is provided adjacent its ends, and on diametrically opposite sides thereof, with a pair of grooves or notches 27 that slidably interfit with the walls 26 of yoke 25 to limit rotary and axial movement of the shaft 19 with respect to the leg 15.

The two end legs or posts 11 are also identical castings the upright portion of each of which is in the form of a channel formed by two spaced side walls or flanges 28 interconnected by a web 29 (see Fig. 4). The top of web 29 forms a yoke 30 which is similar to the yoke 25 in leg 15 and which also receives one end of a roll shaft 19 through its notches 27. The leg 11 includes a pair of integral oppositely spaced aligned bosses 31 that project toward each other from the inner surfaces of the flanges or walls 28 and which are spaced from the web 30. These bosses 31 on the spaced flanges or walls 28 each provide a downwardly facing surface, shoulder or abutment 32 and an upright surface, shoulder or abutment 33 that slopes in a direction extending from the flange or web 28 toward the open side of the leg channel. All of these surfaces, shoulders or abutments cooperate with elements of a clip or key 34, hereinafter described, for locking the shaft 19 in the yoke 30 of leg 11.

As seen clearly in Fig. 1 of the drawings, the ends of the dead shafts 19 of the end rolls 17 are carried one in a leg 11 and the other in a leg 15, while the opposite ends of the dead shaft 19 of the center roll 17 are each carried in one of the center legs 15. Each dead shaft 19 is a tube through which lubricant, such as grease, may be forced to lubricate the anti-friction bearings by which the roll shells 18 are mounted upon the shafts 19. The adjacent ends of the shafts 19 are held in alignment by the yokes 25 of center legs 15 and they press against the block 24 of resilient material confined between the walls 21 and 23 to compress it. Block 24 includes a bore 35 that connects the ends of said shafts 19 and through which grease may pass from one shaft 19 to the other. Because the block 24 in each leg 15 is compressed by the ends of the shafts 19, the blocks 24 resiliently urge the shafts 19 axially apart at all times and, thereby cause the side surfaces of the notches or grooves 27 in shafts 19 to engage the walls 23.

From the foregoing it will be seen that rotary motion of the shafts 19 with respect to the legs 11 and 15 is limited by the notches 27 in the shafts and yokes 25 and 30 in legs 15 and 11, respectively, and that endwise or axial movement of the shafts 19 is limited by the cooperation of the side walls of the notches 27 and said yokes 25 and 30. Grease may be forced into the end one of the dead shafts 19 and caused to flow through the lubricating passage formed by shafts 19 and blocks 24 through a grease fitting 36.

In order to insure that the ends of the dead shafts 19 cannot be accidentally or inadvertently removed from the yokes 25 and 30, safety clips, keys or straps 37 and 34 are provided. The clips 37 cooperate with the center legs 15 to retain the shafts 19 and blocks 24 therein and the clips 34 cooperate with the end legs 11 to retain the shafts therein.

The clips 37 are stamped or pressed in one piece from sheet metal and each includes a plate-like body portion 38 having flanges 39 formed thereon which engage the tops of the adjacent dead shafts 19 and the top of the compressible block 24 when the clip 37 is fastened on one of the legs 15, as shown in Fig. 3 of the drawings, to prevent upward movement of any of these parts with respect to the leg 15. Each clip 37 also includes a pair of spaced legs 40 bent at right angles from opposite sides of the body portion 38. Adjacent its bottom each leg 40 is slit to form an ear, tab or abutment means 41 which is attached at one side to the leg 40 and which may be bent or pressed from the plane in which said leg 40 lies.

When the clip 37 is attached to the top of one of the legs 15 to safety lock the top assembly thereof, its legs 40 straddle the walls 21 and embrace and abut the outer abutment surfaces 42 thereof and the ears or tabs 41 are than bent inwardly, as by the use of a hammer and punch, into an opening 43 formed in each of the walls 21. The top, downwardly facing abutments or shoulders 44 of openings 43 and the top or upwardly facing abutments or shoulders 45 of ears or tabs 41 cooperate to interlock the clip 37 and leg 15, and consequently to interlock the ends of shafts 19, the block 24 and leg 15 into a unit. The clip 37 may be removed from the top of leg 15 by prying its legs 40 outwardly until the ears or tabs 41 become disengaged from the abutments 44. The clip 37 may then be lifted from the supporting leg 15. Clip 37 is reusable.

The clips 34 employed to safety lock each end of a dead shaft 19 to an end leg 11 are also stamped or pressed in one piece from sheet metal and each includes a plate-like body portion 46 having an opening 47 formed in its upper portion which is adapted to receive an end of one of the shafts 19. A pair of spaced legs 47 are bent at right angles from opposite sides of the body portion 46 and each of these legs provides an upwardly facing shoulder or abutment 48 adapted to engage the downwardly facing abutments 32 provided by the bosses 31 of leg 11 when the clip 34 is positioned within the channel formed by the flanges 28 and web 29. Legs 47 also abut the spaced inner abutment surfaces of the flanges 28 to prevent rotary motion of the clip 34 with respect to the leg 11.

Immediately above the legs 47 there is a second pair of ears or tabs 49 which are spaced on opposite sides of the body 46 and bent therefrom. These ears or tabs are bent, as by a hammer and punch, so that their end abutments or surfaces 50 are brought into engagement with the abutments 33 provided by the bosses 31 when the clip 34 is positioned as seen in Fig. 5 of the drawings, to prevent the clip 34 from being moved axially along the shaft 19 and becoming disengaged from either the shaft or the leg. The abutments 32 and 48 cooperate to prevent the clip 34, and, of course, the shaft 19, from being moved vertically in the yoke 30 of leg 11.

From the foregoing description it will be seen that this invention provides improved and simplified supporting or carrying means for the shafts of conveyor rolls and improved safety lock clips that cooperate with the improved support means through simple ears, legs or tabs that may be bent into engagement with abutments on the support means to interlock the elements carried thereby into a unit.

It will also be seen that this invention provides improved safety clips per se which are one-piece sheet metal stampings including integral bendable ears, legs, tabs or abutments that may be bent, pressed or driven, as by a hammer and punch, into engagement with abutments, shoulders or the like located at opposite sides of a yoke formed in a conveyor shaft supporting element and that the clips so provided may be removed and re-used by bending and rebending portions of them.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. Supporting means for a shaft comprising an upwardly directed yoke seating the shaft between the opposite faces thereof, locking means for securing the shaft within the yoke comprising a clip having a shaft engaging portion adapted to engage the shaft opposite the yoke to oppose movement of the shaft out of the yoke, and means securing the clip in shaft-locking position including an abutment having a shoulder facing away from the direction of the yoke, and a leg on the clip extending laterally therefrom engaging the shoulder to prevent movement of the clip upwardly toward the yoke opening and locking the shaft in the yoke.

2. Supporting means for a shaft comprising an upwardly directed yoke seating the shaft between the opposite faces thereof, locking means for securing the shaft within the yoke comprising a clip having a shaft-engaging portion adapted to engage the shaft opposite the yoke to oppose movement of the shaft out of the yoke, and means securing the clip in shaft-locking position including a shoulder, and a leg on the clip extending laterally therefrom engaging the shoulder to prevent movement of the clip upwardly toward the yoke opening and locking the shaft in the yoke.

3. Supporting means for a shaft comprising an upwardly directed yoke seating the shaft between the opposite faces thereof, locking means for securing the shaft within the yoke comprising a clip having a shaft engaging portion adapted to engage the shaft adjacent an end thereof opposite the yoke to oppose movement of the shaft out of the yoke, and means securing the clip in shaft-locking position including a shoulder, a leg on the clip engaging the shoulder to prevent movement of the clip upwardly toward the yoke opening for locking the shaft in the yoke, a second shoulder laterally directed with respect to the yoke, and an ear on the clip engaging said second shoulder to prevent removal of the clip from the end of the shaft.

4. Supporting means for a shaft comprising a channel member with a web and laterally extending walls at opposite side edges of the web, an upwardly directed yoke in the web seating the shaft between the opposite faces thereof, locking means for securing the shaft within the yoke comprising a clip having a shaft-engaging portion adapted to engage the shaft opposite the yoke to oppose movement of the shaft out of the yoke, and means securing the clip in shaft-locking position including shoulders on the laterally extending walls facing away from the direction of the yoke, and legs on the clip extending laterally therefrom disposed in engagement with the shoulders preventing movement of the clip upwardly toward the yoke opening and locking the shaft in the yoke.

5. Supporting means for a shaft comprising a channel member having a web and laterally extending walls at the opposite side edges of the web, an upwardly directed yoke seating the shaft between the opposite faces thereof, locking means for securing the shaft within the yoke comprising a clip having a shaft-engaging portion adapted to engage the shaft opposite the yoke to oppose movement of the shaft out of the yoke, and means securing the clip in shaft-locking position including an abutment on each of the laterally extending walls each having a shoulder facing away from the direction of the yoke and a second shoulder laterally directed with respect to the yoke, legs on the clip in engagement with the first said shoulders preventing movement of the clip upwardly toward the yoke opening and locking the shaft in the yoke, and ears on the clip disposed in engagement with the second shoulders to prevent removal of the shaft-engaging portion of the clip from the end of the shaft.

References Cited in the file of this patent

UNITED STATES PATENTS

| | | |
|---|---|---|
| 1,111,474 | Lenfestey | Sept. 22, 1914 |
| 1,499,920 | Godden | July 1, 1924 |
| 2,312,610 | Weiss | Mar. 2, 1943 |